United States Patent [19]

Nakamura et al.

[11] E Re. 30,613

[45] Reissued May 19, 1981

[54] SHEARING TOOL FOR SYNTHETIC RESIN TUBES

[75] Inventors: Masahiko Nakamura, Matsuzaka; Hidehiko Itou, Hisai, both of Japan

[73] Assignee: Matsuzaka Iron Works, Inc., Tsu, Japan

[21] Appl. No.: 27,663

[22] Filed: Apr. 6, 1979

Related U.S. Patent Documents

Reissue of:

[64] Patent No.: 4,084,317
Issued: Apr. 18, 1978
Appl. No.: 793,320
Filed: May 3, 1977

[30] Foreign Application Priority Data

Dec. 11, 1976 [JP] Japan ..... 51-166532[U]

[51] Int. Cl.[3] ..... B23D 21/06

[52] U.S. Cl. ..... 30/94; 30/190; 30/251; 30/258; 81/313; 81/314

[58] Field of Search ..... 30/94, 251, 190, 258; 81/313, 314, 318, 321, 322, 323, 324, 325, 329

[56] References Cited

U.S. PATENT DOCUMENTS

| | | | |
|---|---|---|---|
| 331,787 | 12/1885 | Harlow | 30/94 |
| 718,796 | 1/1903 | Rose | 30/251 |
| 824,172 | 6/1906 | Chausse | 30/94 |
| 1,524,197 | 1/1925 | Mayhew | 30/258 |
| 1,820,169 | 8/1931 | Wigand | 30/251 |
| 3,273,240 | 9/1966 | Florian | 30/251 |
| 3,390,455 | 7/1968 | Florian | 30/251 |
| 4,094,064 | 6/1978 | Nishikawa | 30/251 |

FOREIGN PATENT DOCUMENTS

| | | | |
|---|---|---|---|
| 225598 | 1/1959 | Australia | 30/251 |

*Primary Examiner*—Othell M. Simpson
*Assistant Examiner*—J. T. Zatarga
*Attorney, Agent, or Firm*—Sellers and Brace

[57] ABSTRACT

A shearing tool for synthetic resin tubes, in which a lower jaw is connected to the leading end of an upper handle portion, a lower handle portion is pivoted to said lower jaw at its leading end, an opening is provided in forward portion of said upper handle portion extending therefrom to the leading end of said lower jaw, an arcuate tube receiving recess is provided in the upper surface of said lower jaw, said shearing blade is pivoted in an intermediate position of the length to said upper handle portion within said opening, said shearing blade is provided at the rear and lower end with an engaging pawl, a rocking bar having notches in the upper surface is pivoted at one end to the leading end of a lower handle portion, a slot is provided in the rear portion of said shearing blade, a connection link has at one end a pin freely received within said slot and is pivoted at the other end to an intermediate position of the length of said rocking bar, a spring is provided for urging said rocking bar against said engaging pawl and a spring is provided for normally urging said upper and lower handle portions away from each other.

26 Claims, 5 Drawing Figures

SHEARING TOOL FOR SYNTHETIC RESIN TUBES

Matter enclosed in heavy brackets [ ] appears in the original patent but forms no part of this reissue specification; matter printed in italics indicates the additions made by reissue.

BACKGROUND OF THE INVENTION

This invention relates to a shearing tool for synthetic resin tubes such as hard vinyl chloride tubes and hard vinyl conduit tubes.

Synthetic resin tubes were hithertofore sheared by a saw, but such shearing operation by the saw required rather long time and much labor and the cut faces produced in the sheared tubes were unsatisfactory to the degree that the cut faces required trimming or elaborate finish and thus, the shearing of synthetic tubes by saws were inefficient. Furthermore, although various shearing tools in the form of scissors for synthetic resin tubes have been proposed and practically employed, such prior art shearing tools have the following inherent disadvantages:

1. During the shearing operation, the tube can not be supported in a stablized state and therefore, the shearing operation is difficult and can not produce a satisfactory or exact cut face and as a result, it requires an additional step for trimming or finishing the cut face.

2. Since a great deal of manual effort or gripping force is required, a powerful and sufficient shearing force can not be obtained.

3. Since a tube is not suitably supported, the tube tends to easily crack and/or break.

4. A positive and precise shearing action can not be obtained easily and requires a skilled hand for the purpose.

5. The tube can not be sheared with a constant manual effort or gripping force from the beginning to the completion of the shearing operation and as a result, a smooth shearing operation can not be easily performed.

6. Production cost is high and the shearing operation is expensive.

SUMMARY OF THE INVENTION

Therefore, one object of the present invention is to provide an improved shearing tool for synthetic resin tubes whereby a synthetic tube is held in a stabilized state during the shearing of the tube, the shearing operation is performed in a simple manner and a precise cut face can be produced in the tube.

Another object of the present invention is to provide a shearing tool for synthetic resin tubes whereby a powerful and sufficient shearing force can be obtained with a minimum manual effort or gripping force.

Another object of the present invention is to provide a shearing tool for synthetic resin tubes whereby the possibility of tube cracking and/or breakage can be obviated.

Another object of the present invention is to provide a shearing tool for synthetic resin tubes whereby a positive shearing force can be easily obtained with a substantial constant manual effort or gripping force and as a result, the tube can be easily sheared without requiring any skilled hand.

Another object of the present invention is to provide a shearing tool for synthetic resin tubes which can be easily produced at less expense.

The above and other objects and attendant advantages of the present invention will be more readily apparent to those skilled in the art from a reading of the following detailed description in conjunction with the accompanying drawings which show one preferred embodiment of the invention for illustration purpose only, but not for limiting the scope of the same in any way.

PREFERRED EMBODIMENT OF THE INVENTION

Figure 1:
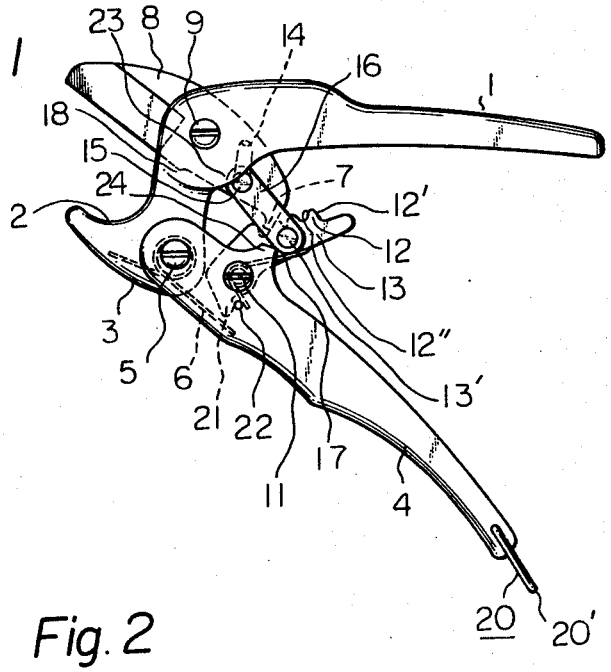
FIG. 1 is a side elevational view of a preferred embodiment of shearing tool for synthetic resin tubes constructed in accordance with the present invention showing the tool in an open position.
Figure 2:
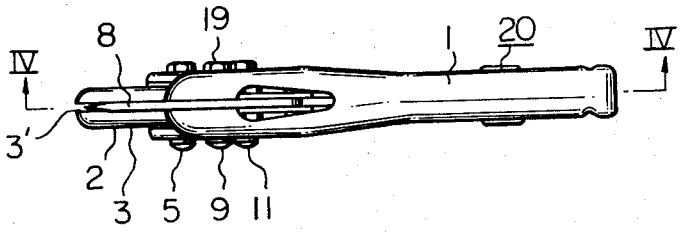
FIG. 2 is a plan view of the shearing tool shown in FIG. 1.
Figure 3:
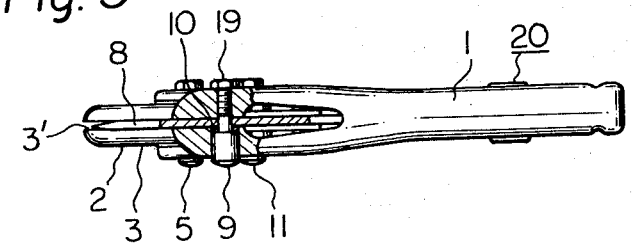
FIG. 3 is a plan view of the shearing tool shown in FIG. 1, with a portion thereof broken away to show the connection between the shearing blade and the upper handle.
Figure 4A:
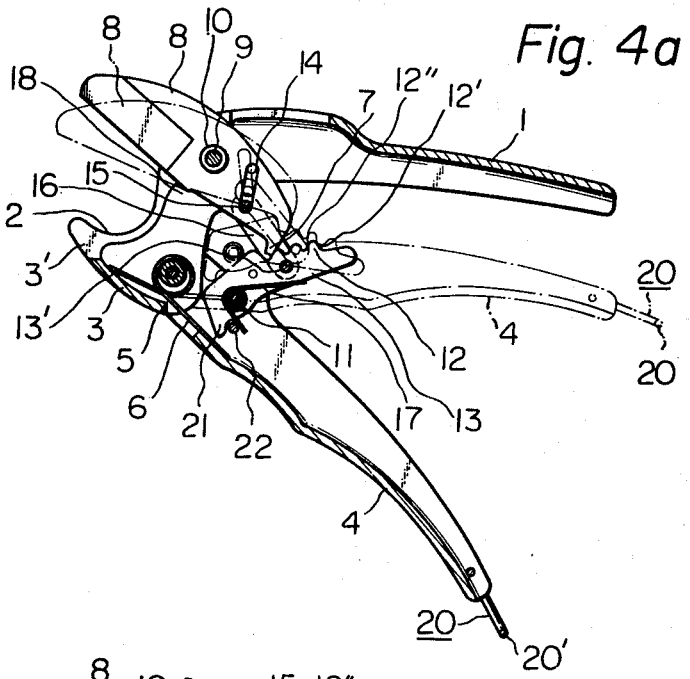
FIG. 4a is a sectional view taken along the line IV—IV of FIG. 2 showing the tool in full open position by the full lines and in closed position of first cycle by the one-dot chain lines, respectively.

The present invention will be now described referring to the accompanying drawings and more particularly, to FIG. 1 thereof. The shearing tool of the invention generally comprises a handle which includes an upper handle portion 1 and a lower handle portion 4. The upper handle portion 1 has an integral lower jaw 3 formed at or connected to the leading end of the handle portion and the lower jaw has an arcuate tube receiving recess 2 in the upper surface thereof. *Jaw 3 is aptly described as J-shaped with the outer end of its stem portion integral with the forward end of handle 1.* The upper handle portion 1 further has an opening 3' extending from the forward portion of the handle portion to the leading end of the lower jaw 3 for the purpose to be described hereinafter. The leading end of the lower handle portion 4 is pivoted to the lower and rear end of the lower jaw 3 by means of a pivot pin 5. A shearing blade 8 is received in the opening 3' and pivoted to the upper handle portion 1 in an intermediate position of the length by means of a bolt 9 and has an engaging pawl 7 formed at and extending downwardly from the rear end of the blade. A rocking bar 13 is pivoted at one end to the forward portion of the lower handle portion 4 by means of a pivot pin 11 and has a series of notches 12 in the upper surface for the purpose to be described hereinafter. A link bar 16 is pivoted at one end to an intermediate portion of the length of the rocking bar 13 by means of a pivot pin 13' and has at the other end a pin 15 which is in turn freely received within a slot 14 formed in the rear portion of the shearing blade 8. A spring 17 is disposed about the pivot pin 11 with one or the upper end abutting against the rocking bar 13 and the other or lower end against an anchoring pin 22 provided on the lower handle portion 4 adjacent to the pivot pin 11 so that the spring urges the rocking bar 12 against the engaging pawl 7 of the blade 8. A return spring 6 is disposed about the pivot pin 5 with the opposite ends of the spring abutting against the lower jaw 3 and lower handle portion 4 so that the spring 6 serves to return the lower handle portion 4 to the initial position when the upper and lower handle portions 1, 4 are released from a gripping force therefrom after one cycle of tube shearing operation. A frictional resistance augmentation washer 10 is disposed on the bolt pin 9 in abutment against one side of the shearing blade 8 within the opening 3'. Reference numberal 18 denotes a connection neck which integrally connects the leading end of the upper handle portion 1 to the lower jaw 3, reference numeral 19 denotes a nut threaded on the bolt 9 and reference numeral 20 denotes a substantially U-shaped stopper which includes a pair of legs pivoted to the rear end portion of the lower handle portion 4 and a cross member 20' connecting the legs together and which is adapted to engage on the upper handle portion 1 at the rear end thereof with the cross arm 20' positioned on the upper surface of the upper handle portion 1 when the shearing tool is in its non-operative position, whereby the upper and lower handle portion 1, 4 are prevented from inadvertently moving away from each other. Reference numeral 21 denotes a rotation limit stopper formed at and extending downwardly from the lower end of the rocking bar 13 for engaging the anchoring pin 22 provided on the lower handle portion 4 so as to limit the rocking movement of the rocking bar in the return direction. Reference numerals 23, 24 denote bulges formed on the lower surface of the upper handle portion 1 and the upper surface of the lower handle portion 4, respectively in opposing relation and serve as stoppers adapted to limit a minimum distance between the upper and lower handle portions 1, 4 when they are gripped for performing one cycle of tube shearing operation. In the illustrated embodiment, the face 12' of each of the series of notches 12 where the notch engages the engaging pawl 7 of the shearing blade 8 is disposed substantially normal in relation to the longitudinal axis of the rocking bar 13 and the opposite sliding face 12'' of the notch 12 is disposed at an inclined angle with respect to the engaging face 12'. The notches 12 are disposed in an inclination with respect to the cutting edge of the shearing blade 8 in the counterclockwise direction. *As appears from FIGS. 4a and 4b, successive ones of the teeth 12 engage pawl 7 during a cutting cycle as it pivots about the axis of bolt 9 during a cutting operation. It will therefore be recognized that handle 4 acts through a lever arm of constant length, namely, the distance between pawl 7 and the axis of bolt 9 thereby providing a constant mechanical advantage throughout the full closing cycle of blade 8.* With the construction and arrangement of the notches 12 as mentioned just above, as the engaging pawl 7 of the shearing blade 8 moves upwardly in the counterclockwise direction during tube shearing operation, the engaging pawl 7 successively engages the successively outwardly positioned notches beginning with the innermost notch and ending at the outermost notch so that a synthetic resin tube can be easily sheared even when the upper and lower handle portions 1, 4 pivot by a small amount during one cycle of tube shearing operation.

Figure 4B:
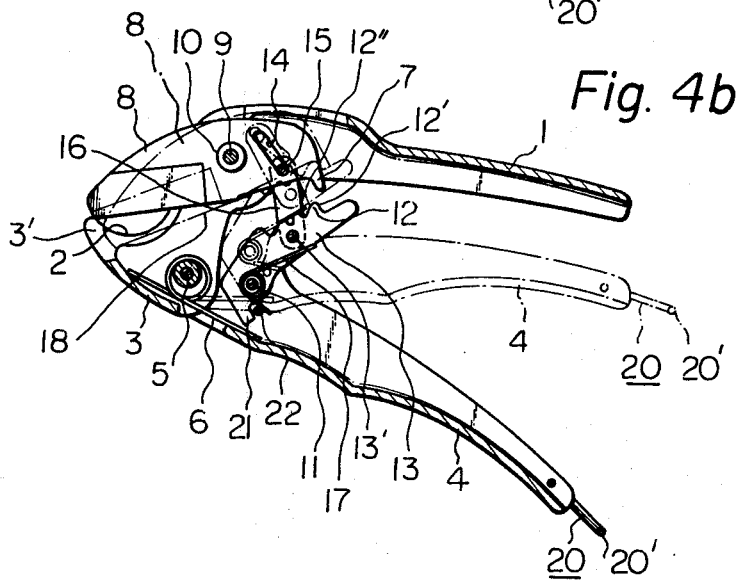
FIG. 4b is a similar view to FIG. 4a but showing the tool in open position of last cycle by the full lines and in full closed position by the one-dot chain lines, respectively.

In operation, first of all, the stopper is disengaged from the upper handle portion 1. When the operator grips the upper handle portion 1 in one hand and the lower handle portion 4 in the other hand and opens or causes the handle portions to pivot away from each other as shown in FIG. 1, the lower handle portion 4 pivoted to the lower jaw 3 at the leading end of the upper handle portion 1 at 5 can easily pivot about the pivot pin 5 in the clockwise direction with the aid of the resiliency of the return spring 6. At this time, the rocking bar 13 is prevented from pivotal movement by the engagement of the stopper 21 with the pin 22 and pulls the connection link 16 downwardly. Whereby the shearing blade 8 which is received within the opening 3' in the upper handle portion 1 and frictionally held in position by the washer 10 is pulled substantially downwardly by the pin 15 which is now in the lowest position in the slot 14 in the rear portion of the blade and therefore, the blade 8 pivots about the bolt 9 in the clockwise direction against the frictional force to a predetermined farmost position from the lower jaw 3. With the shearing blade 8 held in this position, a synthetic resin tube such as a hard vinyl chloride or hard vinyl conduit tube is received in the arcuate tube receiving recess 2 in the lower jaw 3. And then the operator gradually applies a tightening force to the upper and lower handle portions 1, 4 whereby the lower handle portion 4 pivots upwardly about the pivot pin 5 in the counteclockwise direction against the resiliency of the return spring 6 and the rocking bar 13 pivoted to the lower handle portion 4 at 11 moves pin 15 upwardly along the slot 14 in the blade 8 while causing the connection link 16 to pivot with respect to the rocking bar. At this time, since the engaging pawl 7 of the shearing blade 8 is engaged to the innermost notch 12 of the rocking bar 13, the rear portion of the blade 8 is pushed upwardly by the rocking bar 13. As pushed upwardly in the manner mentioned just above, the blade 8 pivots about the pivot pin 9 in the counterclockwise direction and as a result, the cutting edge in the front part of the blade 8 gradually cuts in the synthetic resin tube. At this time, since the innermost notch 12 is subjected to the reaction force from the engaging pawl 7 of the shearing blade 8, the rocking bar 13 pivots in the clockwise direction against the resiliency of the return spring 17. And thereby the initial stage of the tube shearing operation is completed. At the completion of the initial shearing operation on the synthetic resin tube, the operator partially release his tightening force from the upper and lower handle portions 1, 4 whereupon the lower handle portion 4 is caused to pivot downwardly in the clockwise direction and thus, the rocking bar 13 pivoted to the lower handle portion 4 at 11 also moves downwardly and at the same time, tends to pivot in the counterclockwise direction towards the engaging pawl 7 under the resiliency of the return spring 17. At this time, the shearing blade 8 and accordingly, the cutting edge of the blade tends to pivot about the pivot pin 9 upwardly in the clockwise direction by the resiliency of the synthetic resin tube. However, since the blade 8 is frictionally held in position within the opening 3' by the friction washer 10, the blade 8 is prevented from moving upwardly and held in position. As the lower handle portion 4 moves downwardly or pivots in the clockwise direction under the action of the return spring 6, the distance from the pivot pin 11 to the engaging pawl 7 of the shearing blade 8 becomes greater than the distance from the pivot pin 11 to the innermost notch 12 of the rocking bar 13 in which the engaging pawl 7 of the blade 8 now engages whereupon the engaging pawl clears the notch 12. As a result, the rocking bar 13 pivots in the counterclockwise direction by the action of spring 17 as mentioned hereinabove whereby the engaging pawl 7 of the shearing blade is now automatically engaged to the notch adjacent to or positioned immediately outwardly of the innermost notch. The returning of the lower handle portion 4 by the action of the spring 6 is limited at the position where the handle portion 4 is restrained from further movement by the connection link 16. By repeating the above-mentioned sequence of operation, the engaging pawl 7 of the shearing blade 8 successively engages the successively outwardly positioned notches and the cutting edge of the shearing blade 8 cuts in the synthetic resin tube deeper and deeper to the position indicated by the one dot-chain line as shown in FIG. 4b where the cutting edge is bodily received within the arcuate tube receiving recess 2 in the lower jaw 3. Throughout the whole shearing operation as mentioned hereinabove, since the distance from the pivot bolt 9 about which the shearing blade 8 pivots to the engaging pawl 7 which engages the notches 12 in the rocking bar 13 is maintained constant, the synthetic resin tube can be sheared with a substantially constant shearing force.

Therefore, according to the present invention, since the upper surface of the lower jaw 3 at the leading end of the upper handle portion 1 is provided with the arcuate tube receiving recess 2 which has a shape conforming to the contour of the synthetic resin tube to be sheared by the shearing tool and the tube is received within the recess during the shearing operation, the synthetic tube can be held in position in a stablized state and the shearing operation can be easily performed. Furthermore, since the shearing blade descends down perpendicularly through the opening 3' in the lower jaw 3 from the top to the bottom of the tube, the cut face of the sheared synthetic resin tube is exactly normal to the longitudinal axis of the tube, very fine and precise, so that any trimming or finishing step after the shearing operation is not required. And since the engaging pawl is provided in the rear portion of the shearing blade and adapted to selectively engage the notches formed in the rocking bar, as the upper and lower handle portions repeatedly open and close or pivot away from and toward each other, the engaging pawl advances from the innermost notch to the outermost notch step by step, a sufficient shearing can be obtained with a light manual effort or gripping force by only one hand. In addition, since the distance from the engaging pawl on the shearing blade for engaging the notches in the rocking bar to the pivot which pivotally connects the shearing blade to the upper handle portion is constant, the synthetic resin tube can be smoothly and rapidly sheared with a substantially uniform shearing force throughout the whole shearing operation without requiring any skilled hand. Still furthermore, since the engaging pawl and notches may be provided on the rear portion of the shearing blade and the upper edge portion of the rocking bar, respectively, the shearing tool can be easily produced at less expense. Thus, the shearing tool of the invention has great practical value.

While only one embodiment of the invention has been shown and described in detail it will be understood that the same is for illustration purpose only and not to be taken as a definition of the invention, reference being had for this purpose to the appended claims.

What is claimed is:

1. A shearing tool for synthetic resin tubes comprising: an upper handle portion;

a lower jaw connected to the leading end of said upper handle portion and provided with an arcuate tube receiving recess in the upper surface of said jaw;

said upper handle portion being further provided with a blade receiving opening extending from the forward portion of said upper handle portion to the leading end of said lower jaw;

a lower handle portion pivoted at the leading end of said lower handle portion to said lower jaw;

a shearing blade pivoted in an intermediate position of the length of said blade to said upper handle portion within said opening and having an engaging pawl formed at and extending downwardly from the rear end of said blade;

said shearing blade further including a slot formed in the rear portion thereof;

a rocking bar pivoted at one end to the forward portion of said lower handle portion and provided with notches in the upper surface of the rocking bar;

a connection link pivoted at one end to an intermediate position of the length of said rocking bar and having at the other end a pin freely received within said slot in the blade;

a spring normally urging said rocking bar against said engaging pawl; and a return spring for returning said lower handle portion to the initial position when a gripping force is released from said upper and lower handle portions.

2. The shearing tool as set forth in claim 1, in which said lower jaw is connected to said leading end of the upper handle portion by means of a neck portion.

3. The shearing tool as set forth in claim 1, in which a washer is provided about said pivot connection of said shearing blade to said upper handle portion within said opening in abutment against the side of the blade to hold the blade in position.

4. The shearing tool as set forth in claim 1, in which said lower handle portion is provided with a pin which is adapted to engage said rocking bar.

5. The shearing tool as set forth in claim 1, said notches are in series, and the series of notches are inclined with respect to the longitudinal axis of the cutting edge of said shearing blade in the counterclockwise direction.

6. The shearing tool as set forth in claim 5, in which said series of notches have engaging faces disposed substantially normal to the longitudinal axis of said rocking bar.

*7. A shearing tool for cutting elongated stock and the like comprising:*

*first and second handles;*

*said first handle having a J-shaped jaw fixed to and projecting from the forward portion of the first handle, and said second handle being pivotally connected to and projecting rearwardly from the bottom of the stem portion of the J;*

*an elongated cutting blade pivotally supported at the mid-length thereof near the top of the jaw stem portion;*

*a rock lever pivoted at one end to said second handle at a point spaced from the lower end of the jaw stem and provided with a plurality of ratchet teeth along the edge thereof facing toward the rear end of said cutting blade;*

*link means having one end pivoted to the mid-length of said rock lever and having a lost motion connection between the other end thereof and the rear portion of said cutting blade;*

*the rear end of said cutting blade having a pawl positioned to engage successive ones of said ratchet teeth during successive movements of said first and second handles toward and away from one another; and*

*means biasing said rock lever toward engagement with said pawl on said cutting blade.*

*8. A shearing tool as set forth in claim 7 in which the ends of said link means respectively straddle said rock lever and said cutting blade and cooperate therewith in holding said pawl and said ratchet teeth in planar alignment with one another.*

*9. A shearing tool as set forth in claim 7 including a stop positioned to limit pivotal movement of said rock lever toward said pawl and cooperating with said lost motion connection to permit said ratchet teeth to under-ride said pawl as said first and second handles are pivoted apart to restore said blade to the open position thereof.*

*10. A shearing tool as set forth in claim 9 in which said lost motion connection includes an elongated slot in the rear end portion of said blade loosely seating therein a pivot connection to the adjacent end of said link means.*

*11. A shearing tool as set forth in claim 7 including means frictionally restraining said blade against pivotal movement about said pivot support therefor.*

*12. A shearing tool as set forth in claim 7 in which said blade is pivotally supported lengthwise of an elongated slot extending along the stem of said J-shaped jaw and the forward end of said first handle.*

*13. A shearing tool as set forth in claim 12 in which said pivot support for said blade comprises bolt and washer means on said bolt, said bolt extending through said blade and the portions of said stem to either side thereof which bolt is tightened to compress said stem into frictional contact with a juxtaposed face of said blade thereby to prevent unintended pivotal movement of said blade the blade being compressed between the end of said washer means and the face of said slot on the opposite side of the blade from the washer means.*

*14. A shearing tool as set forth in claim 7 in which said J-shaped jaw is slotted to receive the adjacent edge of said cutting blade when the blade is pivoted to the closed position thereof.*

*15. A cutting tool as set forth in claim 7 in which said biasing means includes spring means tending to urge said first and second handles apart and the teeth of said rock lever toward engagement with said pawl on said blade.*

*16. A cutting tool as set forth in claim 15 in which said spring biasing means includes spring means constantly urging said first and second handles apart.*

*17. A cutting tool as set forth in claim 7 in which said biasing means comprises spring means constantly urging the outer end of said rock lever to pivot away from said second handle and toward the pawl of said blade.*

*18. A cutting tool as set forth in claim 7 including stop means interposed between said second handle and said rock lever positioned to limit the pivotal movement of said rock lever toward said pawl thereby to hold said ratchet teeth out of contact with said pawl during movement of said first and second handles toward the spaced apart open positions thereof.*

*19. A shearing tool as defined in claim 7 characterized in that said pivot support for said blade includes frictional resistance augmentation means for varying the resistance of said blade to pivot about the axis of said pivot support.*

*20. A shearing tool for cutting elongated stock and the like comprising:*

*first and second handles;*

*said first handle having a J-shaped jaw fixed to and projecting from the forward portion thereof and the second handle being pivotally connected to and projecting rearwardly from the bottom of the stem portion of the J;*

*an elongated cutting blade pivotally supported at the mid-length thereof near the top of said jaw stem portion;*

*a rock lever pivoted at one end to said second handle at a point spaced from the lower end of said jaw stem portion and extending crosswise of the adjacent end of said blade and having the free end thereof spring-biased toward engagement with said blade end; and*

*the free end of said rock lever and the adjacent and of said cutting blade being inter-engageable by a pawl and a series of ratchet teeth, said pawl and said teeth being relatively movable and sequentially interengageable at substantially the same distance from said blade pivot and cooperable with one another to provide the same mechanical advantage as said first and second handles are operated through successive opening and closing cycles.*

*21. A shearing tool as defined in claim 20 characterized in the provision of means operatively interconnecting said cutting blade and said rock lever for pivoting said blade away from said J-shaped jaw as said first and second handles are pivoted away from one another.*

*22. A shearing tool as defined in claim 21 characterized in the provision of stop means fixed to said second handle and positioned to limit the movement of said rock lever away from the adjacent end of said blade.*

*23. A shearing tool as defined in claim 21 characterized in that said J-shaped jaw and the adjacent end of said first handle are slotted longitudinally thereof and a substantial portion of said cutting blade being located in said slot and pivotally supported on a pivot pin extending crosswise of said slot adjacent the junction of said first handle and said J-shaped jaw.*

*24. A shearing tool as defined in claim 21 characterized in that said second handle in a one-piece molded unit, and in that said first handle and said J-shaped jaw is a one-piece molded unit.*

*25. A shearing tool as defined in claim 23 characterized in that said pivot pin includes frictional resistance augmentation means for varying the force required to be applied to said blade to pivot the same about said pivot pin.*

*26. A shearing tool as defined in claim 21 characterized in that said pivot support for said blade includes washer means encircling a bolt passing through said blade and into a threaded bore in said first handle, said bolt being wrenchable to vary the frictional resistance between the faces of said blade and the juxtaposed surfaces of said first handle and said washer means.*

* * * * *

UNITED STATES PATENT AND TRADEMARK OFFICE

CERTIFICATE OF CORRECTION

PATENT NO. : REISSUE 30613

DATED : May 19, 1981

INVENTOR(S) : MASAHIKO NAKAMURA and HIDEHIKO ITOU

It is certified that error appears in the above-identified patent and that said Letters Patent are hereby corrected as shown below:

Column 8, Claim 24, line 49, change "in" second occurrence to -- is --.

Signed and Sealed this

*Eighteenth* Day of *August 1981*

[SEAL]

*Attest:*

GERALD J. MOSSINGHOFF

*Attesting Officer*

*Commissioner of Patents and Trademarks*